United States Patent

Hosaka et al.

Patent Number: 4,600,650
Date of Patent: Jul. 15, 1986

[54] MAGNETIC RECORDING MEDIUM

[75] Inventors: Akihiko Hosaka; Kiyotaka Okuyama; Kiyoto Kanazawa, all of Tokyo, Japan

[73] Assignee: TDK Corporation, Tokyo, Japan

[21] Appl. No.: 475,181

[22] Filed: Mar. 14, 1983

[30] Foreign Application Priority Data

Apr. 1, 1982 [JP] Japan ................ 57-55019

[51] Int. Cl.$^4$ .......................................... H01F 10/02
[52] U.S. Cl. ........................ 428/413; 428/425.9; 428/522; 428/694; 428/900
[58] Field of Search .................... 427/127–132, 427/48; 252/62.54; 428/900, 694, 425.9, 522

[56] References Cited

U.S. PATENT DOCUMENTS 4,152,485  5/1979  Mizumura .................. 428/425

Primary Examiner—Bernard D. Pianalto
Attorney, Agent, or Firm—Oblon, Fisher, Spivak, McClelland & Maier

[57] ABSTRACT

A magnetic recording medium is composed of a substrate coated with a magnetic layer comprising a magnetic powder and a binder, wherein the binder comprises from 20 to 60% by weight of a polyurethane resin, from 20 to 60% by weight of an epoxy resin, from 15 to 55% by weight of a vinyl chloride-vinyl acetate copolymer resin and a polyisocyanate.

2 Claims, 2 Drawing Figures

FIGURE 2

| Samples | Binder composition (% by weight) | | | Various characteristics | | | | |
|---|---|---|---|---|---|---|---|---|
| | Poly-urethane | Epoxy | Vinyl chloride-vinyl acetate copolymer | Squeak sound | Repeat running durability (times) | Adhesive strength (g) | Gloss degree (dB) | Electromagnetic transfer characteristic 8KHz (dB) |
| A | 35 | 35 | 30 | None | 720 | 37 | 0 | 0 |
| B | 50 | 30 | 20 | None | 680 | 45 | +0.5 | +0.2 |
| C | 30 | 20 | 50 | None | 750 | 30 | +0.2 | +0.1 |
| D | 25 | 50 | 25 | None | 690 | 40 | -0.2 | -0.1 |
| E | 70 | 20 | 10 | Yes | 150 | 65 | +0.7 | +0.5 |
| F | 10 | 20 | 70 | None | 650 | 10 | -0.8 | -0.4 |
| G | 60 | 40 | — | Yes | 80 | 80 | +0.5 | +0.4 |
| H | 30 | 70 | — | Yes | 90 | 65 | -0.7 | -0.5 |
| I | — | 50 | 50 | None | 350 | 25 | 0 | 0 |
| J | — | 70 | 30 | Yes | 270 | 38 | -1.0 | -0.7 |

MAGNETIC RECORDING MEDIUM

The present invention relates to a magnetic recording medium, and particularly to a binder composition capable of improving the physical characteristic of the magnetic recording medium, such as the surface property, durability and adhesive strength without impairing the electromagnetic characteristic as the magnetic recording medium.

In recent years, the usages of the magnetic recording medium have been expanded, and there has been an increasing demand for products having higher quality. Particularly, it is desired to develop a magnetic recording medium having superior electromagnetic characteristic and other physical characteristic, in which both characteristics are well balanced.

In most cases, conventional binder resins such as urethane type, ester type, vinyl chloride-vinyliden chloride type, vinyl chloride-vinyl acetate type, ethylene type, epoxy type, cellulose type and acrylonitrile type resins have been used in combination to form a two component binder composition. Among them, a combination of a polyurethane resin with a nitrocellulose resin, a combination of a polyurethane resin with a vinyl chloride-vinyl acetate copolymer resin and a combination of a polyester resin with a vinyl chloride-vinyl acetate copolymer resin have been used as typical two component binder compositions. However, in each of these two component binders, the electromagnetic transfer characteristic and the physical characteristic are in an opposite relation to each other with respect to the proportions of the two components, whereby it is very difficult to simultaneously satisfy both characteristics. For this reason, it has been difficult to obtain a magnetic recording medium which is superior in both characteristics.

Accordingly, it is an object of the present invention to provide a magnetic recording medium in which the electromagnetic transfer characteristic which is essentially vital to the magnetic recording medium and the physical characteristic, particularly the durability and adhesive strength, are totally improved without impairing the surface smoothness which used to be in an opposite relation to the above characteristics.

According to the present invention, the above object has been accomplished by providing a magnetic recording medium composed of a substrate coated with a magnetic layer comprising a magnetic powder and a binder, wherein the binder comprises from 20 to 60% by weight of a polyurethane resin, from 20 to 60% by weight of an epoxy resin, from 15 to 55% by weight of a vinyl chloride-vinyl acetate copolymer resin and a polyisocyanate.

Namely, in the present invention, the binder in the magnetic coating, which used to be composed of a two component composition, is composed of a three component composition comprising a polyurethane resin, an epoxy resin and a vinyl chloride-vinyl acetate copolymer and the composition is cross-linked with a polyisocyanate, whereby a magnetic recording medium is obtainable which is superior in the overall characteristics including durability, adhesive strength, electromagnetic transfer characteristic and a surface property such as glossiness as compared with the conventional magnetic recording media in which a two component resin composition is used as the binder.

Now, the present invention will be described in detail with reference to the preferred embodiment.

As the polyurethane resin in the three component resin composition of the present invention, there may be used various kinds of commercially available products. As typical examples of such commercial products, there may be mentioned Nippolan 5032, Nippolan 5033, Nippolan 2304 and Nippoland 3022 (trade names) manufactured by Nippon Polyurethane Co. or Estan 5702 and Estan 5703 (trade names) manufactured by Goodrich Chemical Co.

As the epoxy resin, Epikote 834, Epikote 1004 and Epikote 1007 (trade neames) manufactured by Shell Chemical Co. may be used.

As the vinyl chloride-vinyl acetate copolymer resin, VAGH and VYNC (trade names) manufactured by Union Carbide Co. or Elecks A (trade name) manufactured by Sekisui Chemical Co., Ltd. may be used.

Further, as the polyisocyanate, Desmodule L (trade name) manufactured by Bayer AG or Colonate L and Colonate HL (trade names) manufactured by Nippon Polyurethane Co. may be used.

In the accompanying drawings,

FIG. 2 is a Table showing the relationship between the binder resin compositions and the various characteristics of the magnetic recording media thereby obtained.

Figure 1:
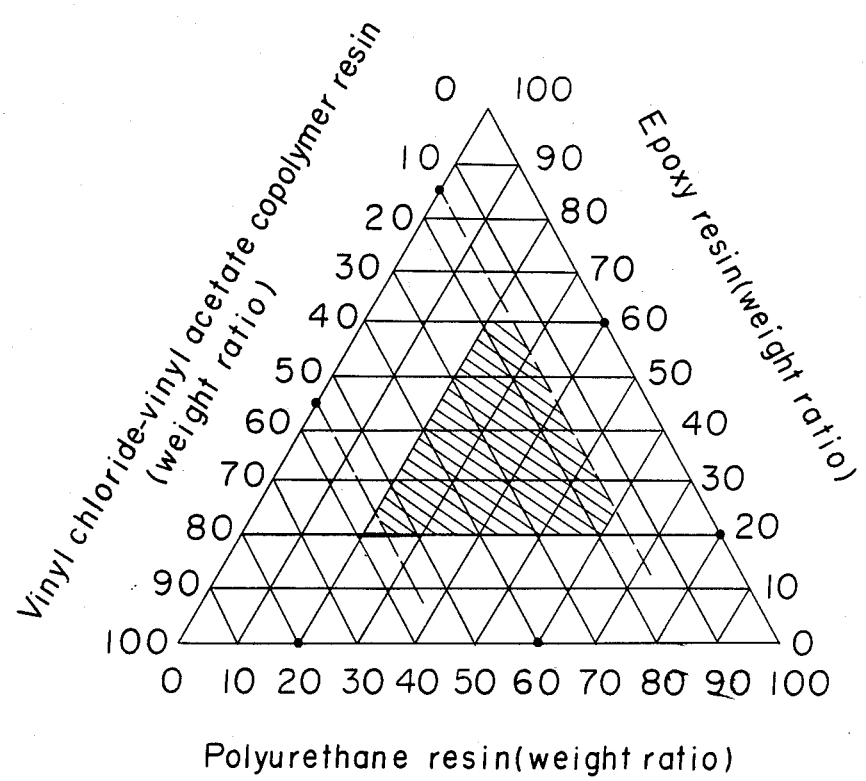
FIG. 1 is a compositional diagram showing the proportional relationship of the three resin components constituting a binder for the magnetic recording medium of the present invention.

Referring to FIG. 1, the proportions of the respective resins in the above three component binder are preferably selected within the range shown by the oblique lines in FIG. 1. Namely, the proportions are selected so that the polyurethane resin constitutes from 20 to 60% by weight, the epoxy resin constitutes from 20 to 60% by weight and the vinyl chloride-vinyl acetate copolymer resin constitutes from 15 to 55%.

If the proportion of the polyurethane resin is less than 20% by weight, the adhesive strength of the magnetic coating to the substrate and the surface property of the coating layer tend to be poor. On the other hand, if the proportion is greater than 60% by weight, the coefficient of friction tends to increase, whereby the durability will be impaired or a squeaky sound generation is likely to be led.

Whereas, if the proportion of the epoxy resin is less than 20% by weight, the bonding strength of the magnetic layer tends to be low and it becomes likely that the magnetic powder falls off from the surface of the magnetic layer, whereby the durability will be poor and the fractuation of the output is likely to be caused. On the other hand, if the proportion of the epoxy resin exceeds 60% by weight, the dispersability for the preparation of the coating tends to be poor, whereby the surface property of the magnetic layer will be deteriorated and the electromagnetic characteristic tends to be poor.

If the proportion of the vinyl chloride-vinyl acetate copolymer resin is less than 15% by weight, the frictional coefficient tends to increase and the durability tends to be poor although the adhesive strength will be thereby improved. On the other hand, if the proportion exceeds 5% by weight, the adhesive stength will be poor although the durability will be improved.

Further, the polyisocyante used as a crosslinking agent, serves to reduce the frictional coefficient and to improve the physical characteristic such as the durability. The amount of the addition of the polyisocyanate is preferably within a range of from 5 to 20% by weight, based on the total amount by weight of the resin components. If the amount is less than 5% by weight, no adequate effectiveness as the crosslinking agent is obtainable. On the other hand, if the amount exceeds 20% by weight, the improvement of the adhesive strength of the magnetic layer to the substrate will be impaired or deteriorated, and it is likely to accelerate the formation of a curl.

A magnetic coating is prepared by mixing the above-mentioned three component binder composition with magnetic powder and other additives such as a dispersing agent, a lubricant, a crosslinking agent or a solvent, which are commonly used for the preparation of the magnetic recording media of this type. The method of preparing such a magnetic coating and the method of applying the magnetic coating to a substrate to obtain a magnetic recording medium can readily be conducted in accordance with conventionally well known techniques. Accordingly, the details of such methods are omitted here.

The magnetic recording medium, such as a magentic tape, of the present invention prepared by applying a magnetic coating containing the above-mentioned binder comprising the three resin components, has excellent electromagnetic transfer characteristic and other physical characteristic.

Now, the present invention will be described in further detail with reference to examples.

EXAMPLE 1

| | |
|---|---|
| $\gamma$-$Fe_2O_3$ powder containing Co | 100 parts by weight |
| Dispersing agent (lecithin) | 2 parts by weight |
| Polyurethane resin (Nippolan 2304 manufactured by Nippon Polyurethane Co.) | 7 parts by weight |
| Epoxy resin (Epikote 1007 manufactured by Shell Chemical Co.) | 7 parts by weight |
| Vinyl chloride-vinyl acetate copolymer resin (VAGH manufactured by Union Carbide Co.) | 6 parts by weight |
| Lubricant | 1.5 parts by weight |
| Methyl-ethyl ketone | 150 parts by weight |
| Methyl-isobutyl ketone | 50 parts by weight |
| Cyclohexanone | 50 parts by weight |

The above components were introduced in a coating composition dispersing machine and thoroughly mixed and dispersed. Then, polyisocyanate (Colonate L manufactured by Nippon Polyurethane Co.) as a crosslinking agent was added in an amount of 12% by weight based on the resin components, and the mixture was thoroghly stirred to obtain a uniform magnetic coating. This magnetic coating was applied on to a substrate made of a polyester film having a thickness of 12 $\mu$m to form a coating layer having a thickness of 6 $\mu$m. Then, the coating layer was subjected to super calender surface treatment and then cured at a temperature of 60° C. for 40 hours to obtain a thermosetting tape material. This tape material was cut in a width of 3.81 mm to obtain an audio magnetic recording medium.

With respect to the audio magnetic recording medium thus obtained, various characteristics such as the adhesive strength, repeat running durability, squeak sound, electromagnetic transfer characteristic and gloss degree were measured. The results thereby obtained are shown in the Table of FIG. 2 as Sample A.

Various magnetic recording media were prepared in the same manner as above except that the resin composition was varried. The characteristics of these magnetic recording media were measured in the same manner as above, and the results thereby obtained are shown in the Table of FIG. 2 as Samples B to J.

In the Table of FIG. 2, the adhesive strength is peeling strength in a direction of 180° between the magnetic layer and the film base, and is represented by a unit of gram per 3.81 mm width. The electromagnetic transfer characteristic and the gloss degree (measured by JM-3D-gloss degree tester manufactured by Murakami Shikisai K.K.) are represented by relative values based on the respective values of Sample A (the magnetic recording medium obtained in Example 1) being set as 0 decibel (dB).

From the results shown in FIG. 2, it is evident that with Samples A, B, C and D i.e. magnetic recording media of the present invention, various characteristics such as the adhesive strength, repeat running durability, squeak sound, electromagnetic transfer characteristic and gloss degree are well balanced and the overall characteristics are excellent. Whereas, with Samples E, F, G, H, I and J which are outside the scope of the present invention, there is always at least one characteristic which is extremely inferior while other characteristics are relatively good, and accordingly none of them is totally satisfactory for practical use from the viewpoint of overall characteristics.

As described in the foregoing, the present invention provides a magnetic recording medium composed of a substrate coated with a magnetic layer comprising a magnetic powder and a binder, wherein the binder comprises from 20 to 60% by weight of a polyurethane resin, from 20 to 60% by weight of an epoxy resin, from 15 to 55% by weight of a vinyl chloride-vinyl acetate copolymer resin and a polyisocyanate, whereby the electromagnetic transfer characteristic which is essential to the magnetic recording medium and the physical characteristic, particularly the durability and adhesive strength, are totally improved without impairing the surface smoothness which used to be impaired when improving other characteristics in a conventional manner.

We claim:

1. In a magnetic recording medium composed of a substrate coated with a magnetic layer comprising a magnetic powder and a binder, an improvement wherein the binder comprises from 20 to 60% by weight of a metal sulfonate group free polyurethane resin, from 20 to 60% by weight of an epoxy resin, from 15 to 55% by weight of a vinyl chloride-vinyl acetate copolymer resin and a polyisocyanate.

2. The magnetic recording medium according to claim 1 wherein the amount of the polyisocyanate is from 5 to 20% by weight, based on the total amount by weight of said resins.

* * * * *